United States Patent Office 3,184,425
Patented May 18, 1965

3,184,425
POLYVINYL CHLORIDE PLASTICIZED WITH EPOXY CONTAINING MONOCARBOXYLIC ACID ESTERS OF CRESOLS AND XYLENOLS
John J. Jaruzelski, Westfield, N.J., and Marjan Kolobielski, Pittsburgh, and Chester S. Sheppard, Edgewood, Pa., assignors to United States Steel Corporation, a corporation of New Jersey
No Drawing. Filed Oct. 6, 1961, Ser. No. 143,307
1 Claim. (Cl. 260—30.4)

This invention relates to novel elastomers comprising polyvinyl chloride plasticized with monocarboxylic- and dicarboxylic-acid esters of cresols and xylenols.

Although some monocarboxylic- and dicarboxylic-acid esters of the cresols and xylenols are known, it is an object of our invention to provide compounds which, when used as plasticizers for polyvinyl-chloride and similar resins, impart superior characteristics to the elastomer, particularly low volatility, high tensile strength, modulus, ductility and tear resistance. Our novel plasticizers are esters of cresols and xylenols having the structural formula:

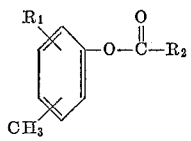

where $R_1$ is chosen from the group consisting of hydrogen and $CH_3$, where $R_2$ is chosen from the group consisting of $(CH_2)_n$—$CH_3$,

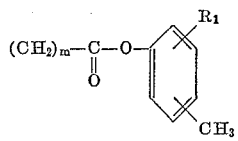

and

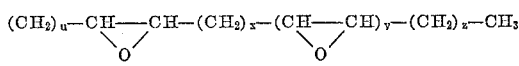

where $m$ is 2 to 34, $n$ is 1 to 22, $u$ is 2 to 20, $x$ is 0 to 18, $y$ is 0 to 1, $z$ is 0 to 18, and when $y$ is 0, $x$ is 0.

These monocarboxylic- and dicarboxylic-acid esters of the cresols and xylenols have been found to be excellent plasticizers for resins such as polyvinyl chloride. The plasticized polyvinyl-chloride elastomers obtained by incorporating these esters as plasticizers, possess particularly low volatility, high tensile strength, modulus, ductility, and tear resistance.

The monoesters of saturated monocarboxylic acids and cresols or xylenols may be used alone as plasticizers for polyvinyl-chloride resins. However, we have found that these monoesters, when employed as secondary plasticizers with another primary plasticizer, give plasticized polyvinyl-chloride elastomers possessing exceptionally high clarity and good color. These esters have the general formula and following method of preparation:

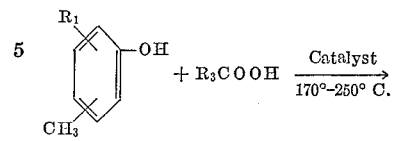

where $R_1$ is chosen from the group consisting of hydrogen and $CH_3$, and where $R_3$ is an alkyl radical containing from 2 to 23 carbon atoms. As secondary plasticizers, these esters are superior to n-butyl stearate, a typical commercial secondary plasticizer. Besides the exceptionally high clarity and good color displayed by plasticized polyvinyl-chloride elastomers obtained by incorporating these monoesters as secondary plasticizers, the tensile strength, tear resistance, thermal stability, and elongation are also considerably better than those obtained when conventional secondary plasticizers, such as n-butyl stearate, are employed.

The diesters derived from the dicarboxylic acids and the cresols and xylenols are excellent primary plasticizers for polyvinyl-chloride resins. These diesters have the general formula and following method of preparation:

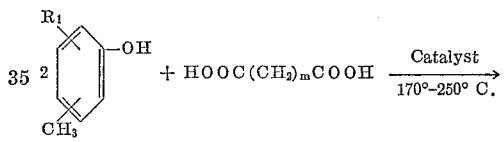

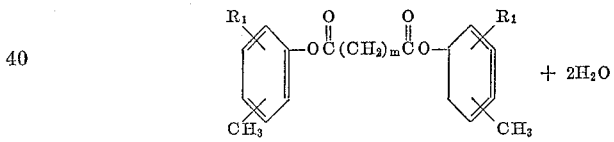

where $R_1$ is chosen from the group consisting of hydrogen and $CH_3$ and where $m$ is 2 to 34. The elastomers produced with these diesters and polyvinyl-chloride resins display exceptionally high tensile strength, thermal stability, tear resistance, and elasticity. They may be molded into many kinds of products, especially those wherein low volatility and high tensile strength are desired.

The catalyst employed in the above methods of preparation is preferably a phosphorous-acid ester, phosphorus trichloride, titanium tetrabutoxide, antimony trichloride or trioxide, bismuth trichloride, arsenic trichloride or aluminum isopropoxide. Other catalysts may be sulphuric acid, arylsulphonic acid, zinc or lead stearate, polyphosphoric acid, or phosphoric acid. The preferred saturated monocarboxylic acids are the fatty acids, such as lauric, myristic, palmitic, and stearic acids. The preferred dicarboxylic acids are those from succinic to sebacic acid, including chain isomers of the higher acids such as isosebacic acid.

The esters derived from unsaturated carboxylic acids, preferably oleic and elaidic acids, and the cresols and xylenols are converted to excellent primary plasticizers by epoxidation. These epoxidized esters are depicted by the general formula and following method of preparation:

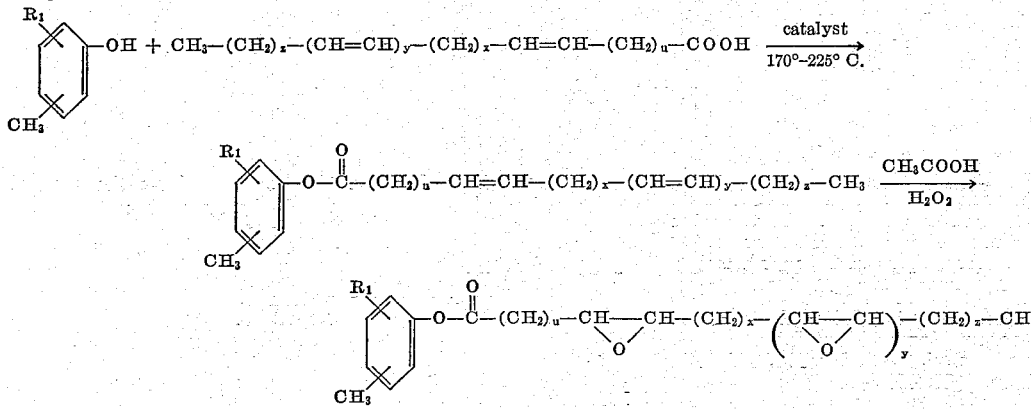

where $R_1$ is chosen from the group consisting of hydrogen and $CH_3$, where $u$ is 2 to 20, $x$ is 0 to 18, $y$ is 0 to 1, $z$ is 0 to 18 and when $y$ is 0, $x$ is 0.

The hydrogen peroxide in the reaction may be replaced by a peracid such as peracetic acid or perbenzoic acid, but hydrogen peroxide is preferred since it is less expensive and more easily handled.

The monoesters, diesters and epoxidized esters of the cresols and xylenols may be incorporated in polyvinyl-chloride resins in amounts from 10 to 120 parts per 100 parts of resin, all parts by weight. However, the preferred concentration is in the range of 30 to 80 parts per 100 parts of resin. Several resins, such as polyvinyl chloride, polyvinyl chloride-polyvinyl acetate copolymers, polystyrene and styrene copolymers, are compatible with these esters, but the preferred resin is polyvinyl chloride.

As secondary plasticizers, the esters derived from the saturated monocarboxylic acids and the cresols and xylenols may be incorporated with a suitable primary plasticizer to give a plasticizer blend containing from 10 to 90 percent by weight of the secondary plasticizer. The preferred range will depend upon the specific properties desired in the elastomer and will generally be in the range of 25 to 75 percent. The plasticizer blend may be incorporated in polyvinyl-chloride resin in amounts from 10 to 120 parts per 100 parts resin, all parts by weight.

A complete understanding of the invention may be obtained from the following typical examples of the process showing how the compounds are made and used.

EXAMPLE 1

Myristic acid (0.25 mole), mixed xylenols (0.28 mole), xylene (25 ml.), and phosphorus trichloride (1.5 ml.) were refluxed under a Dean-Stark water trap at a pot temperature of 230° C. After 12 hours, 0.25 mole of water was obtained in the water trap, indicating that the esterification was essentially 100 percent complete. The product was actually lighter colored than the starting reactants. The xylene and excess xylenols were removed by heating to 200° C. at 0.5 mm. of Hg for a short time to give an almost colorless product, a mixture of xylyl myristates with $n_D^{25}=1.4804$. Its infrared spectrum is in accord with its structure, showing an ester carbonyl band at 5.7 microns and no hydroxyl or carboxylic acid bands. Distillation gave a water-white liquid product boiling in the range 190° to 200° C. at 0.7 mm. of mercury absolute pressure. Also prepared in a similar manner were:

o-Cresyl pelargonate (B.P., 116°–134° C. at 0.2 mm. of Hg; $n_D^{25}=1.4812$)
o-Cresyl stearate (B.P., 210°–212° C. at 0.4 mm. of Hg; (M.P., 41°–42° C.)
o-Cresyl palmitate (B.P., 211°–212° C. at 0.7 mm.)
Mixed m- and p-cresyl palmitates (B.P., 191°–194° C. at 0.2 mm.)
Mixed m- and p-cresyl stearates (B.P., 214°–215.5° C. at 0.3 mm.)
Mixed xylyl palmitates (B.P., 196°–208° C. at 0.2 mm.; $n_D^{25}=1.4798$)
Mixed xylyl stearates (B.P., 200–215° C. at 0.2 mm.; $n_D^{25}=1.4796$)
o-Cresyl oleate (B.P., 190°–207° C. at 0.25 mm.; $n_D^{25}=1.4859$)

EXAMPLE 2

Isosebacic acid (0.33 mole), o-cresol (0.72 mole), xylene (30 ml.), and phosphorus trichloride (2 ml.) were refluxed as in Example 1. After 12 hours, 0.66 mole of water was obtained in the water trap. This indicated that the esterification was essentially 100 percent complete. After removal of the xylene and excess cresol, the bis(o-cresyl) isosebacate was a light-yellow liquid with $n_D^{25}=1.5178$. Its infrared spectrum is in accord with its structure. Distillation gave an almost colorless liquid product boiling in the range 214° to 216° C. at 0.35 mm. of mercury absolute pressure. Also prepared in a similar manner were:

Dixylyl isosebacates (B.P., 248°–256° C. at 0.8 mm. of Hg; $n_D^{25}=1.5164$)
Bis(o-cresyl) adipate (B.P., 195°–214° C. at 0.8 mm.; M.P., 35.0° C.)
Dixylyl adipate (B.P., 215°–230° C. at 0.8 mm.; M.P., 31.2° C.)

EXAMPLE 3 o-Cresyl oleate (0.127 mole) was dissolved in benzene (11.4 ml.) and glacial acetic acid (3.85 grams). To this solution, 0.55 gram of 50 percent sulphuric acid was added, and the mixture was heated to 50° C. with gentle stirring. A solution of 50 percent hydrogen peroxide (9.5 ml.) was added in 15 minutes and the temperature was kept below 65° C. The mixture was stirred at 50° to 60° C. for 8 hours and then transferred to a separatory funnel and the aqueous layer was removed. The oil layer was washed with aqueous potassium carbonate and then with warm water. Then it was heated on a water bath under vacuum to remove the benzene and emulsified water to give the colorless liquid product, o-cresyl 9,10-epoxy-stearate (0.123 mole) with an epoxy-oxygen content of 3.01 percent.

The following esters were chosen as typical primary plasticizers; bis(o-cresyl) adipate, bis(o-cresyl) isosebacate, dixylyl isosebacate, and o-cresyl 9,10-epoxystearate. Elastomers were prepared with these esters as follows. The ester was compounded with polyvinyl-chloride "Geon 121"[1] resin using 39 parts of ester to 59 parts of resin to 2 parts of "Thermolite 31"[2] stabilizer. The mix was baked at 350° F. for ten minutes, and the slabs were molded in a four-place ASTM mold at 290° F. A similar elastomer was prepared from dioctyl phthalate, a typical commercial plasticizer for polyvinyl-chloride resins. A comparison of the properties of the elastomers is given below:

---

[1] "Geon 121" is a trademark of Goodrich Tire and Rubber Co. for polyvinyl resin.
[2] "Thermolite 31" is a trademark of Metal and Thermit Corporation for a line of organotin compounds used as stabilizers for polyvinyl-chloride resins.

Table I

| Ester used [1] | DOCA | DOCI | DXI | EOCO | DOP |
|---|---|---|---|---|---|
| Tensile strength, p.s.i. | 2,325 | 2,426 | 2,623 | 2,168 | 1,873 |
| Elongation, percent | 621 | 638 | 580 | 598 | 486 |
| Modulus at 100% elongation, p.s.i. | 676 | 731 | 881 | 751 | 702 |
| Tear resistance, lb./in. | 335.0 | 355.3 | 379.0 | 292.8 | 211.5 |
| Volatility,[2] wt. loss, g./sq. in./hr. | 0.0233 | 0.0103 | 0.0096 | 0.0118 | 0.0270 |
| Hardness [3] | 78 | 80 | 81 | 79 | 78 |
| Brittleness,[4] °C | −50 | −60 | −30 | −60 | −50 |

[1] DOCA=bis(o-cresyl) adipate. DOCI=bis(o-cresyl) isosebacate. DXI=dixylyl isosebacate. EOCO=o-cresyl 9,10-epoxystearate. DOP=dioctyl phthalate.
[2] Average value over a four-hour period at 350° F. of a disc measuring d=1.25 and h=0.075 inch.
[3] Shore Durometer, Type A-2.
[4] Samples kept in acetone-Dry Ice mixture for two minutes at the desired temperature, removed, and bent immediately in half. If sample did not break, it passed test at temperature shown.

The foregoing comparison of the properties of the elastomers prepared from these esters with those obtained from dioctyl phthalate under the same conditions shows the superiority of the new elastomers in such properties as tensile strength, elongation, tear resistance, and volatility. The preferred esters are especially attractive because of the low volatility obtained in the resultant elastomers. This is a very desirable property in elastomers.

The following esters were chosen as typical secondary plasticizers: o-cresyl stearate, o-cresyl palmitate, o-cresyl pelargonate, xylyl stearates, and xylyl palmitates. Blends containing 25 percent of these esters and 75 percent of dioctyl phthalate were prepared, and elastomers of each blend were obtained as described above. A blend containing 25 percent n-butyl stearate and 75 percent dioctyl phthalate was used to prepare a typical commercial elastomer for comparison. The properties of the resultant elastomers are given above:

The foregoing comparison of the properties of the elastomers prepared from the esters considered secondary plasticizers with those obtained from n-butyl stearate under the same conditions shows the superiority of the new elastomers in such properties as tensile strength, elongation, tear resistance, volatility, clarity, color, and brittleness. The preferred esters are especially attractive because of the high clarity and low volatility obtained in the resultant elastomers. These two very desirable properties are sought in elastomers containing secondary plasticizers.

It will be evident from the foregoing that our invention provides novel compounds which are resin plasticizers superior to those now in use.

Although we have disclosed herein the preferred practice of our invention, we intend to cover as well any change or modification therein which may be made without departing from the spirit and scope of the invention.

We claim:

As a new composition of matter, a polyvinyl-chloride resin and from 10 to 120 parts per 100 parts resin of a compound of the formula:

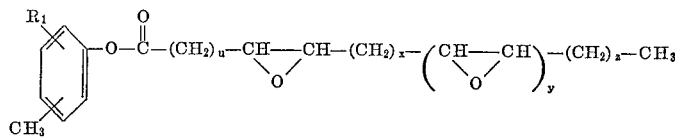

where $R_1$ is chosen from the group consisting of hydrogen and $CH_3$, where $u$ is 2 to 20, $x$ is 0 to 18, $y$ is 0 to 1, $z$ is 0 to 18 and when $y$ is 0, $x$ is 0.

Table II

| Ester used [1] | OCS | OCP | OCPE | XS | XP | NBS |
|---|---|---|---|---|---|---|
| Tensile strength, p.s.i. | 1,685 | 2,024 | 2,280 | 1,794 | 1,785 | 1,470 |
| Elongation, percent | 370 | 428 | 569 | 431 | 487 | 326 |
| Modulus at 100% elongation, p.s.i. | 876 | 828 | 787 | 737 | 694 | 780 |
| Tear resistance, lb./in. | 155.4 | 204.1 | 285.1 | 184.6 | 174.6 | 107.5 |
| Volatility, wt. loss, g./sq. in./hr. | 0.0206 | 0.0251 | 0.0409 | 0.0261 | 0.0212 | 0.0378 |
| Hardness | 80 | 78 | 78 | 82 | 81 | 83 |
| Clarity, percent light transmission | 33.8 | 36.5 | 43.6 | 37.2 | 39.7 | 19.0 |
| Color [2] | 10 | 10 | 10 | 10 | 10 | 9 |
| Brittleness, °C | −60 | −60 | −50 | −70 | −60 | −50 |

[1] OCS=25 percent o-cresyl stearate and 75 percent dioctyl phthalate.
OCP=25 percent o-cresyl palmitate and 75 percent dioctyl phthalate.
OCPE=25 percent o-cresylpelargonate and 75 percent dioctyl phthalate.
XS=25 percent xylyl stearates and 75 percent dioctyl phthalate.
XP=25 percent xylyl palmitates and 75 percent dioctyl phthalate.
NBS=25 percent n-butyl stearate and 75 percent dioctyl phthalate.
[2] 0=yellow; 10=water-white.

References Cited by the Examiner

UNITED STATES PATENTS

| | | | |
|---|---|---|---|
| 2,755,262 | 7/56 | Dilke et al. | 260—31.8 |
| 2,779,771 | 1/57 | Phillips et al. | 260—30.4 |
| 2,858,323 | 10/58 | Smith | 260—485 |
| 2,862,904 | 12/58 | Mullins | 260—30.4 |
| 2,870,170 | 1/59 | Payne et al. | 260—348 |
| 2,889,338 | 6/59 | Dazzi | 260—348 |
| 2,920,055 | 1/60 | Leistner et al. | 260—31.2 |
| 2,924,583 | 2/60 | Starcher et al. | 260—30.4 |
| 3,048,600 | 8/62 | Jaruzelski | 260—31.2 |

ALEXANDER H. BRODMERKEL, *Primary Examiner.*

WILLIAM H. SHORT, MORRIS LIEBMAN,
*Examiners.*